(12) United States Patent
Nakata et al.

(10) Patent No.: US 8,919,825 B2
(45) Date of Patent: Dec. 30, 2014

(54) BITE-IN TYPE PIPE CONNECTION STRUCTURE

(75) Inventors: Haruo Nakata, Sakai (JP); Takashi Shimamura, Sakai (JP)

(73) Assignee: Daikin Industries, Ltd., Osaka-shi (JP)

( * ) Notice: Subject to any disclaimer, the term of this patent is extended or adjusted under 35 U.S.C. 154(b) by 716 days.

(21) Appl. No.: 13/128,648

(22) PCT Filed: Jan. 15, 2010

(86) PCT No.: PCT/JP2010/050396
§ 371 (c)(1),
(2), (4) Date: May 11, 2011

(87) PCT Pub. No.: WO2010/084827
PCT Pub. Date: Jul. 29, 2010

(65) Prior Publication Data
US 2011/0214450 A1   Sep. 8, 2011

(30) Foreign Application Priority Data

Jan. 21, 2009   (JP) ................. 2009-011385

(51) Int. Cl.
*F16L 19/08* (2006.01)
*F16L 19/065* (2006.01)
*F16L 19/10* (2006.01)
*F16L 19/14* (2006.01)

(52) U.S. Cl.
CPC ............... *F16L 19/10* (2013.01); *F16L 19/14* (2013.01); *F16L 2201/10* (2013.01)
USPC ......... 285/342; 285/339; 285/341; 285/382.7

(58) Field of Classification Search
USPC ..................... 285/339, 341, 342, 343, 382.7
See application file for complete search history.

(56) References Cited

U.S. PATENT DOCUMENTS

| 3,830,532 A * | 8/1974 | Roberts ..................... 285/341 |
| 4,586,731 A * | 5/1986 | Castrup ........................ 285/4 |
| 2006/0138774 A1 | 6/2006 | Williams et al. |
| 2009/0045624 A1 | 2/2009 | Nakata et al. |
| 2009/0102191 A1 | 4/2009 | Nakata et al. |
| 2010/0059996 A1 * | 3/2010 | Ciprich et al. ............. 285/342 |

FOREIGN PATENT DOCUMENTS

| JP | 2004-308689 A | 11/2004 |
| JP | 2007-232210 A | 9/2007 |
| WO | WO 2007/114360 A1 | 10/2007 |
| WO | WO 2008/114589 A1 | 9/2008 |

* cited by examiner

*Primary Examiner* — James Hewitt
(74) *Attorney, Agent, or Firm* — Birch, Stewart, Kolasch & Birch, LLP

(57) ABSTRACT

A bite-in type pipe connection structure is provided, the pipe connection structure being capable of, even if piping connection work is performed with a length of piping inserted insufficiently, minimizing deterioration of air-tightness at the joint portion, at which the piping is connected, due to an offset load acting on the piping. Also provided are a valve, a bite-in type pipe joint, and a refrigeration device using the bite-in type pipe connection structure. A ferrule is provided with: a low-strength portion which, when a coupling member becomes fastened to a joint body by manually rotating the coupling member, allows the distal end portion of the ferrule to deform so that the distal end portion restrains a length of piping which is to be connected; a level changing portion which connects a front tapered surface, which corresponds to the low-strength portion, and a rear tapered surface; and a rearward portion which is adjacent to the low-strength section. The level changing portion is formed so that the wall thickness of the rearward portion has a value which can airtightly retain the piping to be connected.

14 Claims, 9 Drawing Sheets

Front Rear

PRIOR ART

BITE-IN TYPE PIPE CONNECTION STRUCTURE

TECHNICAL FIELD

The present invention relates to a bite-in type pipe connection structure, a valve using the bite-in type pipe connection structure, a bite-in type pipe joint, and a refrigeration device.

BACKGROUND ART

Pipe joints are used to join pipes together in piping systems such as refrigerant piping for refrigeration devices, hot-water supply piping for water heating devices, and water supply piping. In such a case, pipes to be connected need to be inserted to predetermined positions in a pipe joint. Accordingly, a step may be formed in a pipe insertion port of a pipe joint, into which a pipe to be joined is inserted. When the distal end of the pipe is inserted into the pipe insertion port and contacts the step, the structure allows a worker to sense the contact through noise or tactile sensation through the worker's hand.

For example, Patent Document 1 discloses such a conventional bite-in type pipe joint. FIG. 10 illustrates the bite-in type pipe joint. As shown in FIG. 10, a joint body 110 has an external thread cylinder 112, and an external thread portion 111 is formed on the outer circumference of the external thread cylinder 112 to be screwed to a coupling member 120. In the center of the external thread cylinder 112, a pipe insertion port 113 and a communication hole 114 continuous to the port 113 are formed. A step 115 is formed at the boundary between the pipe insertion port 113 and the communication hole 114. The step 115 functions as a restricting portion that restricts the position of the distal end of a pipe 100 to be connected. A cam surface 116 is formed at the entrance of the pipe insertion port 113.

The coupling member 120 has an internal thread cylinder 122, and an internal thread portion 121 is formed on the inner circumference of the internal thread cylinder 122 to be screwed to the external thread portion 111. A pipe through hole 124 is formed in the center of a side wall 123 of the internal thread cylinder 122. A pressing surface 125 is formed on the inner surface of the internal thread cylinder 122. A ferrule 130 is located inside the internal thread cylinder 122. The ferrule 30 is integrally coupled to the side wall 123 of the internal thread cylinder 122 with a thin portion 126 extending in the radial direction.

The ferrule 130 has a pipe insertion hole 131 at its center and a notch 132 in a front portion. The notch 132 is formed by cutting in the inner circumferential surface of the pipe insertion hole 131 radially toward the outside. The rear corner (on the right as viewed in the drawing) of the notch 132 forms an edge portion 133, which is caused to bite into a pipe to be connected. A distal end portion 134 located in front of the notch 132 (on the left side as viewed in the drawing) is inserted like a wedge into the space between the pipe 100 to be connected and the pipe insertion port 113 at the initial stage of fastening, thereby temporarily retaining the pipe 100.

Typically, when connecting pipes using the bite-in type pipe joint described above, an end of a pipe 100 is inserted into the joint body 110 until the end contacts the step 115 as shown in FIG. 10(a). Thereafter, when the coupling member 120 is fastened to the joint body 110 as shown in FIG. 10(b), the rear end of the ferrule 130 is pressed by the pressing surface 125 of the internal thread cylinder 122, so that the edge portion 133 of the ferrule 130 is caused to bite into the pipe to be connected.

PRIOR ART DOCUMENTS

Patent Document

Patent Document 1: Japanese Laid-Open Patent Publication No. 2007-232210

SUMMARY OF THE INVENTION

Problems that the Invention is to Solve

However, In this case, it may be impossible to obtain a tactile sensation whether or not the distal end of the pipe 100 contacts the step 115. Therefore, insufficient insertion illustrated in FIG. 11(a) may occur, in which pipes are connected without the distal end of the pipe 100 contacting the step 115. In this case, when the coupling member 120 is fastened to the joint body 110 as shown in FIG. 11(b), the pipe 100 moves toward the step 115. This may cause an insufficient bite amount for the edge portion 133 of the ferrule 130.

If such a pipe connection is performed, there will be a space between the distal end of the pipe 100 and the step 115 when the connection is completed. In this case, the distal end of the pipe 100 is not supported by the step 115, and an unbalanced load pressing the pipe 100 sideward may be produced. As a result, bending stress acting on the pipe 100 can reduces the airtightness achieved by biting of the edge portion 133.

The present invention was made for solving the above problems in the prior art, and the objective of the present invention is to provide a bite-in type pipe connection structure that prevents the airtightness at a pipe joint portion from being reduced by an unbalanced load acting on a pipe even if the pipe connecting process is performed with insufficient insertion of the pipe, and to provide a valve using such a bite-in type pipe connection structure, and a refrigeration device using such a bite-in type pipe connection structure.

Means for Solving the Problems

To achieve the foregoing objective, a bite-in type pipe connection structure is provided that includes: a joint body having a cam surface; an annular ferrule formed to have a tapered surface with an outer circumferential surface that becomes wider in a direction opposite to the cam surface, the ferrule having at a center a pipe insertion hole through which a pipe to be connected is passed through; and a coupling member that is fastened to the joint body to press the ferrule against the cam surface of the joint body. The ferrule includes: a low-strength portion for deforming a distal end portion of the ferrule so that the distal end portion restrains a pipe to be connected when the coupling member is manually rotated to be fastened to the joint body; a level changing portion connecting a first tapered surface and a second tapered surface of the tapered surface to each other, the first tapered surface corresponding to the low-strength portion and the second tapered surface being farther from the cam surface than the first tapered surface is; and an adjacent portion that adjoins the low-strength portion from a side opposite to the cam surface, the adjacent portion airtightly retaining the pipe to be connected when the coupling member is fastened to the joint body. The outer diameter of the tapered surface at the boundary between the level changing portion and the second tapered surface is greater than the outer diameter of the tapered surface at the boundary between the level changing portion and the first tapered surface. The level changing portion is formed such that the thickness of the adjacent portion has a value capable of airtightly retaining the pipe to be connected.

Since the bite-in type pipe connection structure of the present invention having these structural characteristics includes the low-strength portion for deforming the distal end portion, the distal end portion of the ferrule can be deformed to restrain the pipe when the coupling member is manually rotated to be fastened to the joint body at an initial stage of a pipe connecting process. Also, a level changing portion is provided for connecting the first tapered surface corresponding to the low-strength portion and the second tapered surface, which is farther from the cam surface than the first tapered surface is. This allows the adjacent portion adjacent to the low-strength portion to have a thickness sufficient for airtightly retaining the pipe to be connected. Therefore, by increasing the thickness of the adjacent portion of the low-strength portion, a force required for deforming a rearward portion to airtightly retain the pipe can be increased. Also, since this configuration improves the pipe retaining force and the airtight retaining performance of the rearward portion, the resistance of the bite-in type pipe connection structure against an unbalanced load is improved. Accordingly, the airtightness is prevented from being reduced by an unbalanced load.

The low-strength portion may be a portion in which a notch is formed, wherein the notch is formed by cutting in the pipe insertion hole radially toward the outside. The low-strength portion can thus be easily formed.

It is preferable that the cross-sectional shape of the notch along the axial direction of the ferrule be triangular and that the intersection between an inner wall of the notch that is on the side close to the adjacent portion and the inner wall of the pipe insertion hole function as a portion for airtightly retaining the pipe to be connected. In this configuration, the intersection is shaped like an edge. Thus, the intersection has a biting-in function as an edge portion that is caused to bite in the pipe to be connected. This improves the pipe retaining force and the airtight retaining performance of the rearward portion.

It is preferable that the cross-sectional shape of the notch along the axial direction of the ferrule be a right triangle and that the intersection of the notch be substantially a right angle. This configuration improves the biting-in function of the edge portion formed at the intersection. As a result, the pipe retaining force and the airtight retaining performance of the rearward portion are further improved.

The outer circumferential surface of the level changing portion is preferably formed as an inclined surface. Even if this configuration is not employed, an increase in the thickness of a part rearward of the edge portion by making the level changing portion as a step increases the pressing force required for airtightly retaining the pipe, so that the resistance against unbalanced loads is increased. In this case, however, the level changing portion having a step is pressed against the cam surface, which damages the cam surface. Therefore, another drawback may be caused that the airtightness between the ferrule and the cam surface will be reduced. In this regard, if the level changing portion is formed by an inclined surface as in the present invention, the cam surface will not be damaged.

The angle defined by the inclined surface and the axis of the ferrule is preferably larger than the angle defined by the first tapered surface and the axis of the ferrule. This configuration allows the level changing portion to be shaped to have appropriate shape and size.

The angle defined by the inclined surface and the axis of the ferrule is preferably larger than the angle defined by the second tapered surface and the axis of the ferrule. This configuration allows the level changing portion to be shaped to have appropriate shape and size.

The boundary between the outer circumferential surface of the level changing portion and the second tapered surface is preferably shaped as a smoothly curved surface. This configuration eliminates a corner that damages the cam surface as described above.

The outer circumferential surface of the level changing portion may be an overall smoothly curved surface that extends from the first tapered surface to the second tapered surface. This configuration eliminates a corner that damages the cam surface as in the described case. Also, the shape and size of the level changing portion can be formed appropriately.

It is preferable that the thickness t1 of the front end of the distal end portion of the ferrule that is adjacent to the cam surface and the outer diameter d of the pipe to be connected have the relationship defined by an expression (1), that is, $0.005 \leq t1/d \leq 0.05$. If t1/d is less than this range, it is difficult to machine the distal end portion. If t1/d is greater than this range, it is difficult to perform temporary pipe retaining process for restraining the pipe by manually turning the pipe.

It is preferable that the thickness t2 of the ferrule at the intersection and the outer diameter d of the pipe to be connected have the relationship defined by an expression (2), that is, $0.01 \leq t2/d \leq 0.1$. If t2/d is less than this range, the resistance against an unbalanced load is reduced, and it is impossible to prevent the airtightness from being reduced by an unbalanced load. If t2/d is greater than this range, it is difficult to perform temporary pipe retaining process by manually turning.

It is preferable that the distance s1 from the front end of the distal end portion to the intersection of the ferrule and the outer diameter d of the pipe to be connected have the relationship defined by an expression (3), that is, $0.02 \leq s1/d \leq 0.1$. If s1/d is less than this range, the pipe to be connected cannot be restrained by deforming the distal end portion. If s1/d is greater than this range, it is difficult to perform temporary pipe retaining process by manually turning.

It is preferable that the length s3 of the level changing portion along the axial direction of the ferrule and the outer diameter d of the pipe to be connected have the relationship defined by an expression (4), that is, $0 \leq s3/d \leq 0.4$. At the same time, it is preferable that the thickness difference t3 between the ends of the level changing portion along the axial direction of the ferrule and the outer diameter d of the pipe to be connected have the relationship defined by an expression (5), that is, $0.03 \leq t3/d \leq 0.1$. It was found out through tests that when the s3/d was greater than the range, the resistance against unbalanced loads decreased, and the airtightness was significantly reduced. Also, it was found out through tests that when t3/d was less than the range, the resistance against unbalanced loads decreased, and the airtightness was significantly reduced, and that when t3/d was greater than the range, the tightening torque of the joint portion became excessively great and the workability was lowered, accordingly.

The valve and the pipe joint according to the present invention are characterized by using as a pipe joint portion any of the above bite-in type pipe connection structures. Therefore, these valves and the pipe joint can prevent airtightness from being reduced by an unbalanced load acting on a pipe.

The refrigeration device according to the present invention is characterized by using the valve or the pipe joint in its refrigerant circuit. Therefore, the refrigeration device according to the present invention prevents airtightness from being reduced by an unbalanced load acting on a pipe.

Effects of the Invention

According to the bite-in type connection structure of the present invention, it is possible to restrain a pipe by deforming the distal end portion of a ferrule by manually rotating a coupling member at an initial stage of the pipe connecting process. Also, a level changing portion is provided for connecting the first tapered surface corresponding to the low-strength portion and the second tapered surface, which is farther from the cam surface than the first tapered surface is. This allows the adjacent portion adjacent to the low-strength portion to have a thickness sufficient for airtightly retaining the pipe to be connected. Therefore, by increasing the thickness of the adjacent portion of the low-strength portion, a force required for deforming a rearward portion to airtightly retain the pipe can be increased. Also, since this configuration improves the pipe retaining force and the airtight retaining performance of the rearward portion, the resistance of the bite-in type pipe connection structure against unbalanced loads is improved. Accordingly, the airtightness is prevented from being reduced by an unbalanced load.

BRIEF DESCRIPTION OF THE DRAWINGS

FIG. 3 presents diagrams showing the bite-in type pie connection structure in the temporary pipe retaining process, where

FIG. 10 presents partial cross-sectional views showing a conventional bite-in type pipe joint, where FIG. 11(a) shows the beginning of fastening of the coupling member when the insertion amount of a pipe into the pipe insertion port is insufficient, and FIG. 11(b) shows the completion of fastening of the typical coupling member when the insertion amount of a pipe into the pipe insertion port is insufficient.

MODE FOR CARRYING OUT THE INVENTION

A bite-in type pipe connection structure according to one embodiment of the present invention will now be described with reference to the drawings.

The bite-in type pipe connection structure of the present embodiment is used in a pipe joint portion of a bite-in type pipe joint in a refrigerant circuit of a refrigeration device such as an air conditioner or in a pipe joint portion in a stop valve for connecting a communication pipe placed between the indoor unit and the out door unit of a separate type air conditioner to the outdoor unit.

Figure 1:
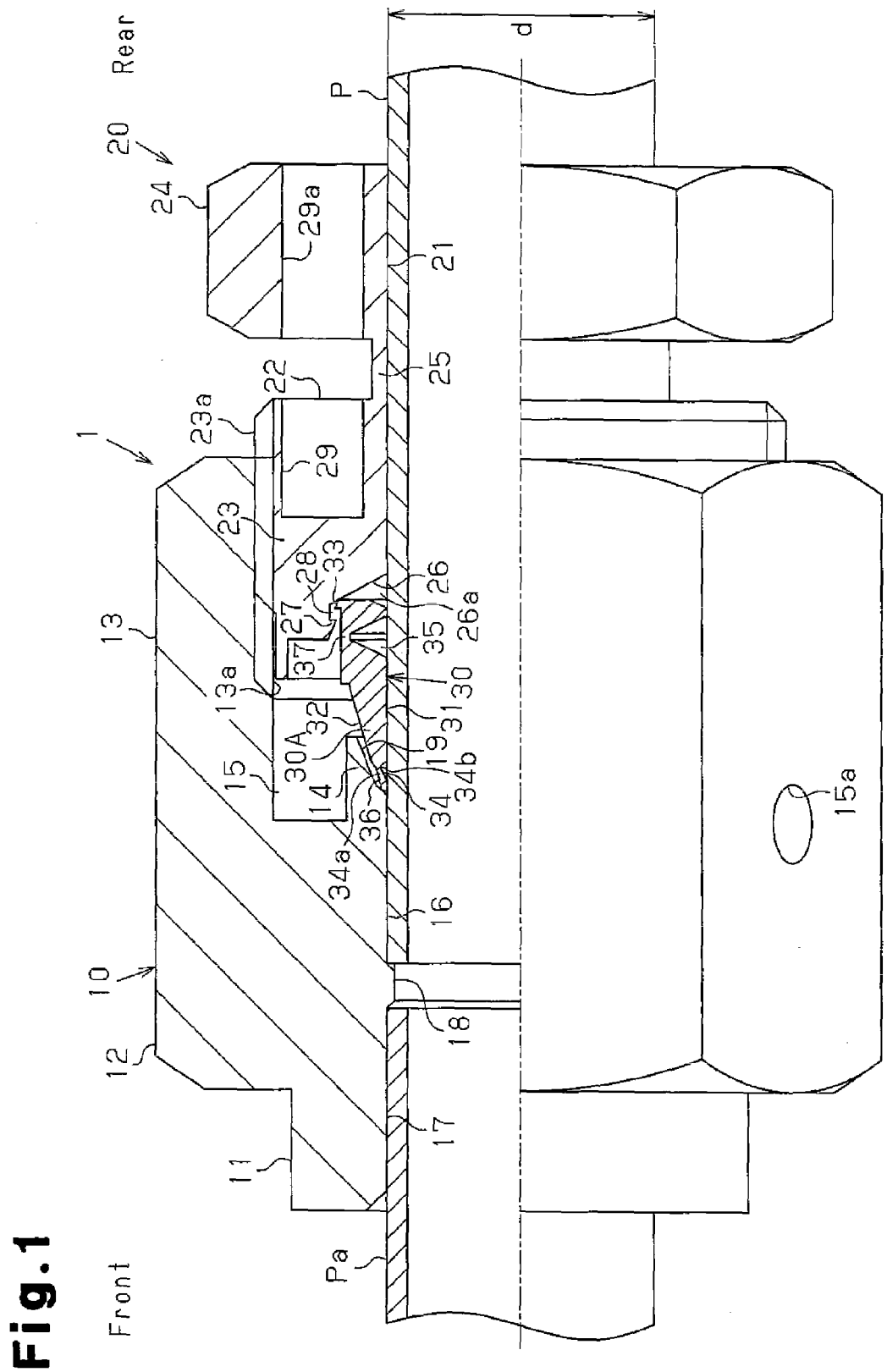
FIG. 1 is a partial cross-sectional view of a bite-in type pipe connection structure according to one embodiment of the present invention, illustrating the beginning of a temporary pipe retaining process.

FIG. 1 is a partial cross-sectional view showing the bite-in type pipe connection structure according to the present embodiment. As shown in FIG. 1, the bite-in type pipe joint 1 includes a joint body 10, a coupling member 20, and an annular ferrule 30 tightly held between the joint body 10 and the coupling member 20. The joint body 10 is attached to a connectable device to which a pipe Pa is connected, and the coupling member 20 is screwed and mounted to the joint body 10. In this description, the side corresponding to the joint body 10, or the left side as viewed in FIG. 1, is referred to as a front side, and the side corresponding to the coupling member 20, or the right side as viewed in FIG. 1, is referred to as a rear side.

The joint body 10 is made of brass. A socket portion 12 is formed in a position forward of a base portion 11 of the joint body 10. An internal thread cylinder 13 is formed at a position behind the base portion 11. A shaft portion 14 is formed in a position rearward of the center of the base portion 11. The shaft portion 14 protrudes into the space inside the internal thread cylinder 13. An internal thread portion 13a is formed on the inner surface of the internal thread cylinder 13. The internal thread portion 13a functions as a screw portion that can be screwed to the coupling member 20. An annular space 15 is formed about the outer circumferential surface of the shaft portion 14. The annular space 15 adjusts the strength of the shaft portion 14 when connecting pipes. A vent hole 15a for preventing the interior from being frozen is formed at the base portion of the annular space 15.

The base portion 11 and the internal thread cylinder 13 are integrally formed to have a hexagonal nut-like shape. A pipe insertion port 16 for receiving a distal end portion of a pipe P is formed in a center of the joint body 10 that corresponds to the shaft portion 14. A pipe insertion port 17 is formed in a center of the joint body 10 that corresponds to the socket portion 12 to receive a distal end portion of the pipe Pa extending from the connectable device. A step 18 is formed between the pipe insertion port 16 and the pipe insertion port 17. The step 18 restricts the positions of the pipes P and Pa. The distal end portions of the pipes P and Pa received in the pipe insertion ports 16, 17 contact end faces of the step 18, so that the positions of the distal ends of the pipes P, Pa are maintained. The front end of the step 18 is tapered through machining with a cutter.

A cam surface 19 is formed at the distal end of the shaft portion 14, or at the entrance of the pipe insertion port 16. The cam surface 19 is continuous at the front end to the pipe insertion port 16, and is tapered with the diameter increasing toward the rear end (toward the coupling member 20).

The coupling member 20 is made of brass and has at its center a pipe through hole 21, through which the pipe P passes. An annular slit 22 is formed in the coupling member

20. The slit 22 is a cut that extends in the radial direction of the coupling member 20 to divide it into two sections. A part of the coupling member 20 forward of the slit 22 has a pipe connecting portion 23. The pipe connecting portion 23 can be screwed to the joint body 10 and forms a pipe connecting mechanism. The coupling member 20 includes a grip portion 24 rearward of the slit 22. The grip portion 24 is graspable with a common fastening tool. The position of the slit 22 in the axial direction is determined such that, when the coupling member 20 is fastened to the joint body 10 and the pipe connecting process is complete, the inner surface of the front side of the slit 22 and the rear end face of the cylinder 13 substantially match each other (see FIG. 4).

An external thread portion 23a is formed on the outer circumference of the pipe connecting portion 23. The external thread portion 23a serves as a screw portion that is screwed to the joint body 10. The outer shape of the grip portion 24 is formed like a hexagonal nut so that it is graspable with a fastening tool. A tubular communication portion 25 is formed in a part of the coupling member 20 that corresponds to the disk-like slit 22. The tubular communication portion 25 is shaped as a thin tube that couples the pipe connecting portion 23 and the grip portion 24 to each other. The tubular coupling portion 25 is designed to have such a strength that it is cut when the rotational torque with which the grip portion 24 is fastened reaches the value of the rotational torque at the completion of pipe connection.

A recess 26a is formed at an end of the pipe connecting portion 23 corresponding to the joint body. A pressing surface 26 for pressing the ferrule 30 is formed on the inner circumferential surface of the recess 26a. The pressing surface 26 is an inclined surface that spreads forward. A protrusion 27, which protrudes radially inward, is formed forward of the pressing surface 26. The inner end face of the protrusion 27 is formed as an inclined surface that spreads forward. An annular increased diameter portion 28 is formed between the protrusion 27 and the pressing surface 26.

Four engaging holes 29 having a circular cross section are formed in the rear end face of the pipe connecting portion 23. The engaging holes 29 serve as engaging portions that engage with a specialized tool for loosening the threaded connection between the joint body 10 and the pipe connecting portion 23 after the pipe connecting process. Machining holes 29a are formed through the grip portion 24 at positions corresponding to the engaging holes 29. The machining holes 29a allow the engaging holes 29 to be machined from behind the grip portion 24.

The ferrule 30 is made of brass and formed independently from the joint body 10 and the coupling member 20. A pipe insertion hole 31 is formed in the ferrule 30. The pipe P is passed through the pipe insertion hole 31. As shown in FIG. 1, the outer circumferential surface of a front portion of the ferrule 30 is formed as a tapered surface 32 that becomes wider toward the rear end, or in a direction opposite to the cam surface 19. The outer circumferential surface of a rear portion of the ferrule 30 is formed as a curved surface substantially parallel to the axis.

An annular protrusion 33 projecting radially outward is formed at the rear end of the ferrule 30. The outer end face of the protrusion 33 is formed as an inclined surface that narrows rearward. The maximum outer diameter of the protrusion 33 is slightly greater than the minimum inner diameter of the protrusion 27 of the coupling member 20. As described above, the inner end face of the protrusion 27 is formed as an inclined surface that spreads forward. This structure allows the protrusion 23 to be easily press fitted into the increased diameter portion 28 of the coupling member 20. That is, when the bite-in type pipe joint 1 is installed, the protrusion 33 is pressed into the increased diameter portion 28 while being deformed along the inner end face of the protrusion 27. The axial dimension of the protrusion 33 is slightly less than the axial dimension of the increased diameter portion 28. Accordingly, the rear end of the ferrule 30 is detachably attached to the recess 26a of the coupling member 20. The ferrule 30 can be transported when temporarily joined to and unitized with the coupling member 20. Also, the ferrule 30 can be mounted to the joint body 10. The protrusion 33, the protrusion 27, the increased diameter portion 28, and the pressing surface formed on the pipe connection portion 23 form a mechanism for temporarily joining the rear end of the ferrule 30.

The corner at which the rear end face of the ferrule 30 and the pipe insertion hole 31 are connected forms a rear edge portion of the ferrule 30.

The ferrule 30 has two notches 34, 35 that are formed by cutting in the inner circumferential surface of the pipe insertion hole 31 toward the outside. The notch 34, which is formed in a front portion of the ferrule 30 in the axial direction, is designed to allow a part of the ferrule 30 forward of the notch 34 to be easily deformed. In other words, when the notch 34 is formed, a thin low-strength portion 34a is formed in a distal end portion 36. By adjusting the thickness of the portion 34a, it is possible to allow the distal end portion 36 to be deformed to restrain the pipe P to be connected when the coupling member 20 is manually rotated to be fastened to the joint body 10.

Figure 2:
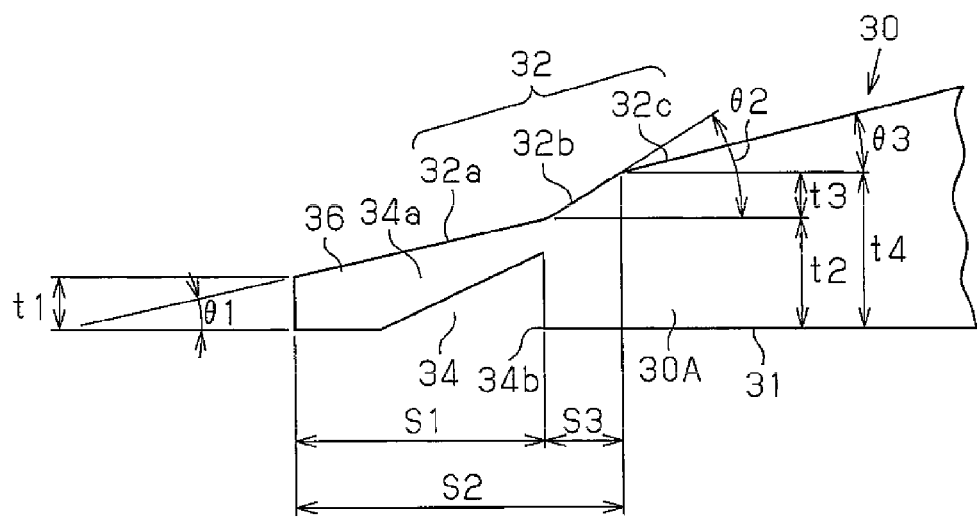
FIG. 2 is a partially enlarged view illustrating the ferrule in the bite-in type pipe connection structure.

As shown in FIG. 2, the cross-sectional shape of the notch 34 along the axial direction of the ferrule 30 is a right triangle, and an intersection 34b is formed at a position where the rear inner wall of the notch 34 and the inner wall of the pipe insertion hole 31 are connected to each other. The intersection 34b holds the pipe P to be connected or bites in the pipe P to airtightly retain the pipe P. More specifically, the intersection 34b of the present embodiment is a corner at which the rear surface of the notch 34 and the inner circumferential surface of the pipe insertion hole 31 substantially form a right angle, and forms a forward edge portion that bites into the pipe P.

The cross section of the notch 35, which is formed in a rear part of the ferrule 30 in the axial direction, is substantially formed to be triangular. A curved surface that is parallel with the axis is formed outside of the notch 35. A thin portion 37 is formed outside the curved surface. Since the thin portion 37 functions as a hinge, the front and rear parts of the ferrule 30 are easily bent inward. This readily allows the tapered surface 32 forming the outer circumferential surface of the front part the ferrule 30 to closely contact the cam surface 19, and the rear edge portion at the rear end of the ferrule 30 to easily bite into the pipe P.

As shown in FIG. 2, a level changing portion 32b is provided on the tapered surface 32 of the ferrule 30. The level changing portion 32b connects a front (first) tapered surface 32a, which corresponds to the above described low-strength portion 34a, and a rear (second) tapered surface 32c to each other. The front tapered surface 32a is located forward of the front edge portion. The rear tapered surface 32c is farther away from the cam surface 19 than the front tapered surface 32a and has a larger diameter. The outer diameter of the tapered surface 32 at the boundary between the level changing portion 32b and the rear tapered surface 32c is greater than the outer diameter of the tapered surface at the boundary between the level changing portion 32b and the front tapered surface 32a. A rearward portion (adjacent portion) 30A is adjacent to and rearward of (on the side opposite to the cam surface 19 of) the low-strength portion 34a. The level changing portion 32b is formed such that the thickness of the rearward portion 30A has a value that can airtightly retain the pipe P to be connected.

The outer circumferential surface of the level changing portion 32b is an inclined surface in the present embodiment. The angle θ2 formed by the outer circumferential surface of the level changing portion 32b and the axis of the ferrule 30 is set greater than the angle θ1 formed by the front tapered surface 32a and the axis of the ferrule 30 and the angle θ3 formed by the rear tapered surface 32c and the axis of the ferrule 30. In the present embodiment, the angle θ1 and the angle θ3 are substantially equal to each other.

The thickness t1 at the front end of the distal end portion 36 of the ferrule 30 and the outer diameter d of the pipe P to be connected (refer to FIG. 1) are set to have the relationship defined by the following expression (1).

$$0.005 \leq t1/d \leq 0.05 \quad \text{Expression (1)}$$

If t1/d is less than 0.005, it is difficult to machine the distal end portion.

The thickness t2 of a part of the ferrule 30 that corresponds to the intersection 34b (that is, the thickness of a part corresponding to the forward edge portion) and the outer diameter d of the pipe P to be connected are set to have the relationship defined by the following expression (2).

$$0.01 \leq t2/d \leq 0.1 \quad \text{Expression (2)}$$

The distance s1 from the front end of the distal end portion to the intersection 34b in the ferrule 30 (that is, the distance from the front end to the forward edge portion) and the outer diameter d of the pipe to be connected are set to have the relationship defined by the following expression (3).

$$0.02 \leq s1/d \leq 0.1 \quad \text{Expression (3)}$$

The length s3 of the level changing portion 32b of the ferrule 30 in the axial direction and the outer diameter d of the pipe P to be connected are set to have the relationship defined by the following expression (4), and the difference t3 in thickness between the front end and the rear end of the level changing portion 32b are set to have the relationship defined by the following expression (5).

$$0 \leq s3/d \leq 0.4 \quad \text{Expression (4)}$$

$$0.03 \leq t3/d \leq 0.1 \quad \text{Expression (5)}$$

The length s3 of the level changing portion 32b in the axial direction is the difference between the distance s1 from the front end of the distal end portion 36 to the front end of the level changing portion 32b and the distance s2 from the front end of the distal end portion 36 to the rear end of the level changing portion 32b. The thickness difference t3 is the difference between the thickness at the front end of the level changing portion 32b, or the thickness t2 at the intersection 34b, and the thickness t4 at the rear end of the level changing portion 32b.

The rear end of the ferrule 30, which is formed as described above, is temporarily joined to the coupling member 20 so as to be unitized, when transported and managed as a component. Specifically, with the center axis of the ferrule 30 and the center axis of the coupling member 20 aligned with each other, the rear end of the ferrule 30 is pressed against the recess of the coupling member 20 to engage the protrusion 33 of the ferrule 30 with the inward protrusion 27, so that the protrusion 33 is press fitted in the increased diameter portion 28. Accordingly, the ferrule 30 and the coupling member 20 are temporarily joined to each other. Since the inward protrusion 27 and the outward protrusion 33 engage with each other in a small area, it is possible to detach them from each other.

A pipe connecting method using the above described coupling member will now be described.

When connecting the pipe P using the joint body 10 and the coupling member 20, the joint body 10 is attached to a predetermined connection object. The predetermined connection object may be a pipe or a pipe connecting port of various types of devices such as a stop valve. In a state where the ferrule 30 is temporarily joined to the coupling member 20, the pipe P is passed through the pipe through hole 21 of the coupling member 20 and the pipe insertion hole 31 of the ferrule 30, so that the coupling member 20 is attached to the outer circumference of the pipe P. The coupling member 20 may be attached to the pipe P in a state where the coupling member 20, to which the ferrule 30 is temporarily joined, is separated from the joint body 10. Alternatively, the pipe P may be inserted from the rear of the coupling member 20 in a state where the coupling member 20, to which the ferrule 30 is temporarily joined, is loosely screwed to the joint body 10. The distal end portion of the pipe P is passed through the pipe through hole 31 of the ferrule 30 and inserted into the pipe insertion port 16. With the distal end contacting the stepped end face of the step 18, the coupling member 20 is fastened to the joint body 10. In this case, the rear end of the ferrule 30 is brought into contact with the pressing surface 26 as shown in FIG. 1.

In this state, the coupling member 20 is manually rotated and fastened. As described above, the thickness t1 of the front end of the distal end portion 36, the thickness t2 at the position of the intersection 34b, and the length s3 of the level changing portion 32b in the axial direction have the relationships with the outer diameter d of the pipe P to be connected expressed by the expressions $0.005 \leq t1/d \leq 0.05$ (Expression (1)), $0.01 \leq t2/d \leq 0.1$ (Expression (2)), and $0.02 \leq s1/d\ 0.1 \leq$ (Expression (3)). The thickness t2 at the position of the intersection 34b is the thickness at the position of the front edge portion and the thickness at the position of the front end of the level changing portion 32b. Therefore, when the coupling member 20 is manually rotated, the distal end portion 36 is deformed to restrain the pipe P. Accordingly, the pipe P is retained temporarily. If t1/d>0.05, t2/d>0.1, or s1/d>0.1, the torque for turning the coupling member 20 is increased to such a level that it is difficult to perform pipe retaining procedure by manual turning. If s1/d<0.02, the pipe restraining force generated by deformation of the distal end portion 36 becomes small, so that the pipe P cannot be retained temporarily.

Figure 3A:
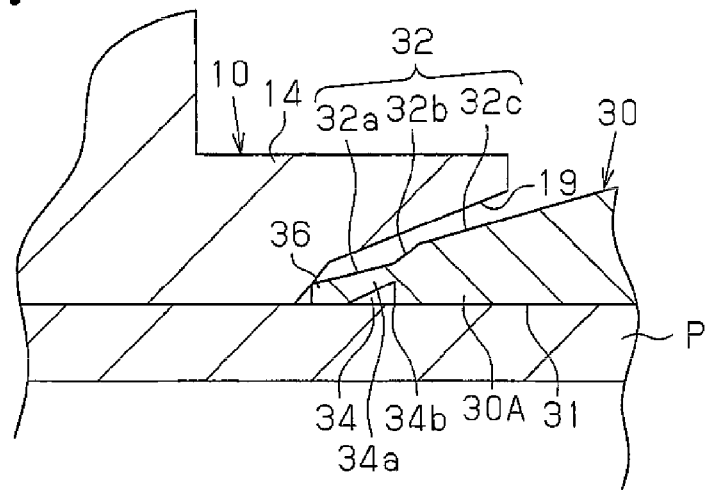
FIG. 3(a) shows the beginning of fastening.
Figure 3B:
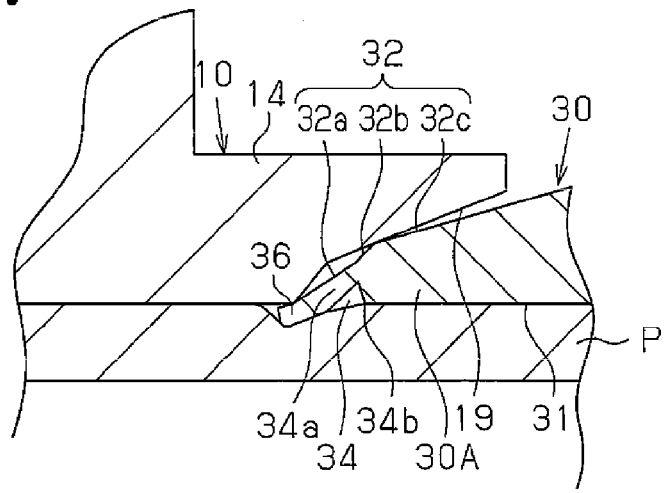
FIG. 3(b) shows a state after the temporary pipe retaining process.
Figure 3C:
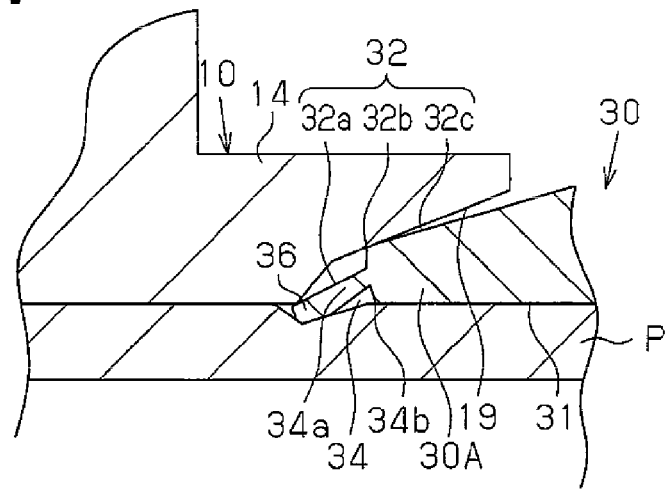
FIG. 3(c) shows a state after a temporary pipe retaining process of a reference example.

FIG. 3 shows changes in the distal end portion 36 in the temporary pipe retaining process. Before manual turning is started, the front end of the distal end portion 36 is in contact with the cam surface as shown in FIG. 3(a). When the coupling member 20 is manually turned from that state, the low-strength portion 34a formed by the notch 34 is deformed, so that the distal end portion 36 is deformed. At this time, the distal end portion 36 of the ferrule 30 is inserted between the pipe insertion port 16 and the pipe P to be connected, bites into the pipe P to be connected, or bites into the pipe P while being inserted between the pipe insertion port 16 and the pipe P, so that the pipe P is restrained. Since the level changing portion 32b is formed on an inclined surface, the rear end of the level changing portion 32b and the rear tapered surface 32c are connected to each other at the boundary at a large angle. Therefore, the pressure at the cam surface 19 by the boundary is low, so that the cam surface 19 is unlikely to be damaged. If the level changing portion 32b is not an inclined surface, but is formed as a step as in the example of FIG. 3(c), the rearward portion 30A airtightly retains the pipe P. In this case, however, the angle at the boundary between the level changing portion 32b and the rear tapered surface 32c is small, and the cam surface 19 is likely to be damaged. This may reduce the airtightness between the ferrule 30 and the cam surface 19. In FIGS. 3(b) and 3(c), the bite amount into the pipe P is exaggerated.

After the temporary retaining procedure of the pipe P is complete as described above, the coupling member 20 is further fastened with a common fastening tool. Therefore, the front intersection 34b of the ferrule 30, that is, the forward edge portion is inclined about the thin portion 37, so that the forward edge portion bites into the pipe P, and the rear edge portion is inclined to bite into the pipe P. The fastening process of the coupling member 20 thus progresses. The radial dimension of the rearward portion 30A is set to such a value that the force required for deforming the rearward portion 30A to airtightly retain the pipe P in the fastening process (that is, the fastening torque) has an appropriately great value. Specifically, the thickness t2 at the position of the intersection 34b (that is, the thickness at the position of the front end of the level changing portion 32b), the thickness difference t3 between the thickness t2 at the position of the front end of the level changing portion 32b and the thickness t4 at the rear end, the length s3 of the level changing portion 32b in the axial direction, and the angle θ3 formed by the rear tapered surface 32c and the center line of the ferrule 30 are adjusted in advance. This allows the force required for deforming the rearward portion 30A to airtightly retain the pipe P (that is, the fastening torque) to have an appropriately great value. As a result, the pipe retaining force and the airtight retaining performance are improved, and the resistance of the rearward portion 30A against an unbalanced load is increased. The airtightness is therefore prevented from being reduced by an unbalanced load. Since the relationship between the length s3 of the level changing portion 32b in the axial direction and the diameter d of the pipe P to be connected is defined by the expression $0.03 \leq t3/d \leq 0.1$, the torque fastening the coupling member 20 is prevented from being excessive. The workability is therefore prevented from being lowered.

Figure 4:
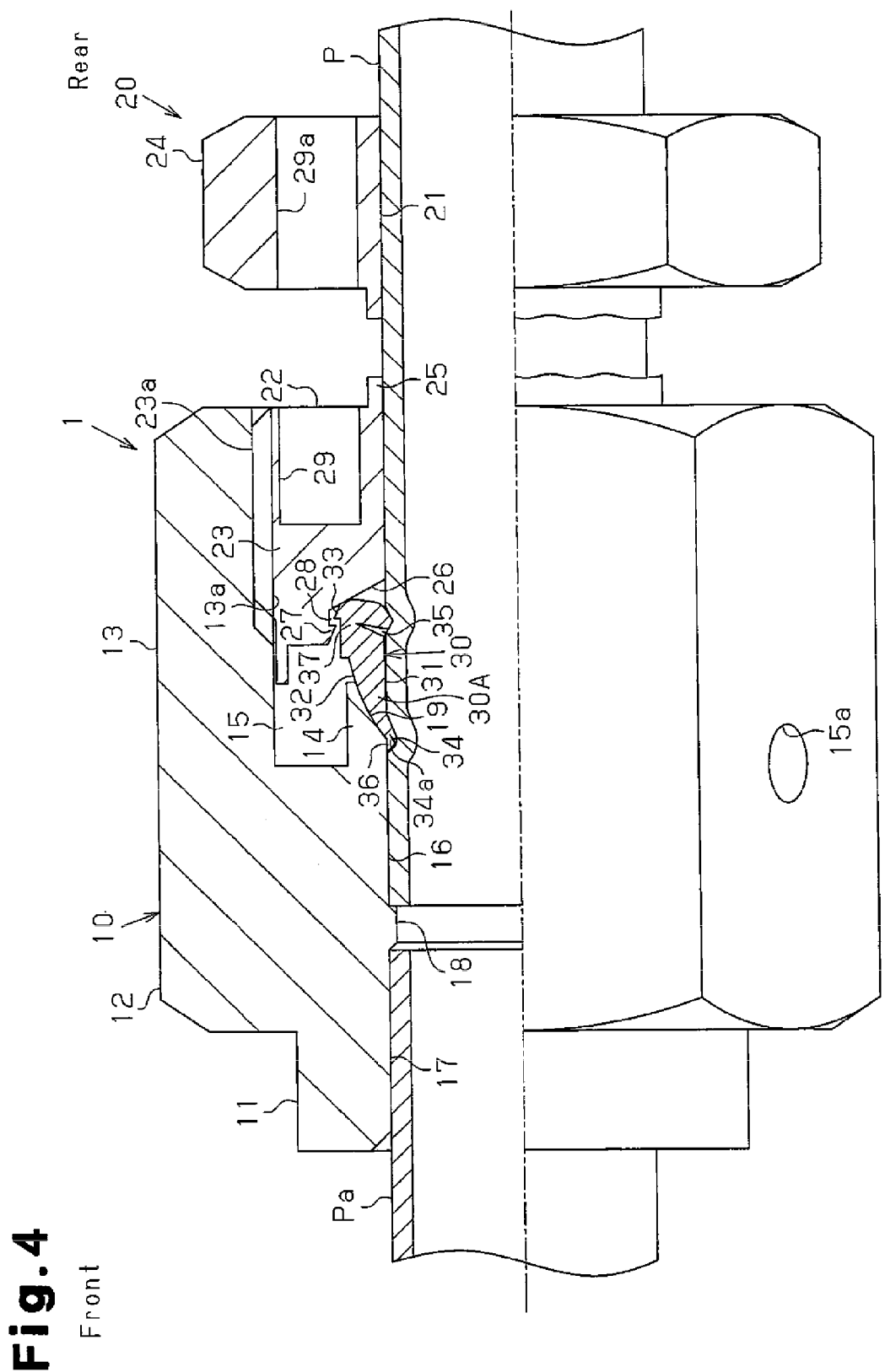
FIG. 4 is a partial cross-sectional view illustrating a state of the bite-in type pipe connection structure when pipe connection is completed.

When the bite amount of the intersection 34b of the ferrule 30, that is, the bite amount of the forward edge portion and the rear edge portion reaches a predetermined level, the rear end face of the internal thread cylinder 13 and the inner surface of the front surface of the disk-like slit 22 are substantially flush with each other as shown in FIG. 4. When the coupling member 20 is fastened to reach this level, the torque fastening the coupling member 20 reaches a predetermined value, so that the tubular coupling portion 25 is cut. As a result, the grip portion 24, which protrudes from the internal thread cylinder 13 of the joint body 10, is separated from the pipe connection portion 23. The pipe connecting process for the coupling member 20 is thus completed.

In the pipe connecting portion fastened in the above described manner, the grip portion 24 is separated. Thus, the threaded connection of the pipe connecting portion 23 is prevented from being loosened by anybody. However, the pipe connection portion 23 can be loosened by using a specialized tool 50 (see FIG. 5) engageable with the engaging holes 29.

Figure 5:
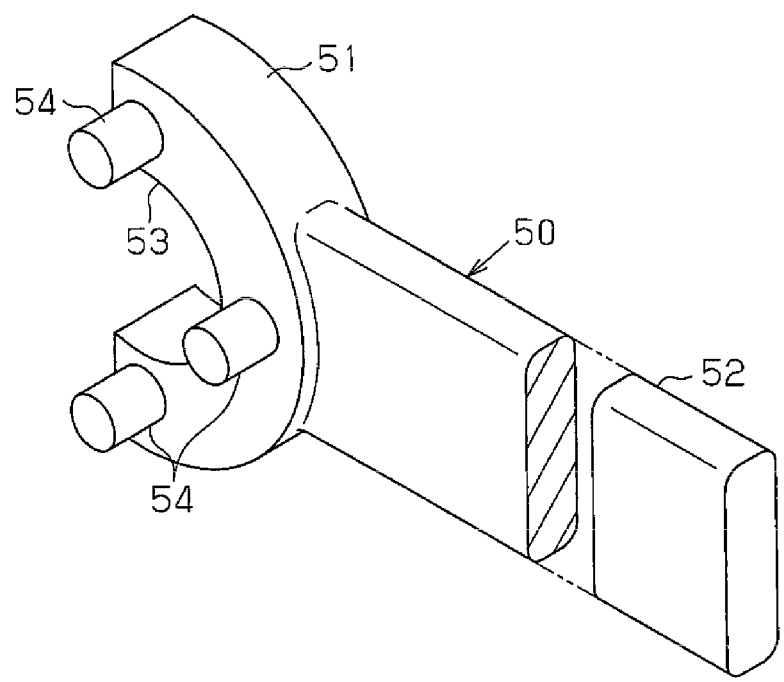
FIG. 5 is a perspective view showing a specialized tool for the bite-in type pipe connection structure.

As shown in FIG. 5, the specialized tool 50 includes a semi-circular base portion 51 and a handle 52 attached to the base portion 51. The base portion 51 has at its center a semicircular opening 53. The inner diameter of the semicircular opening 53 is slightly greater than the pipe P. Three columnar engaging projections 54 are formed on a side of the base portion 51. The engaging projections 54 are engaged with any consecutive three of the four engaging holes 29 of the pipe connecting portion 23.

When disconnecting the pipe, the engaging projections 54 of the specialized tool 50 are engaged with three consecutive engaging holes 29 of the pipe connecting portion 23. Then, some force is applied to the handle 52 to turn the base portion 51. This rotates the pipe connecting portion 23 so as to loosen the threaded connection with the joint body 10, and allows the pipe P to be removed from the joint body 10. According to this method for disconnecting pipes, the pipe P can be disconnected without being cut, and thus simplifies the pipe disconnection procedure. It is also possible to remove the pipe P with the joint body 10 remaining and to remove the ferrule 30, which has been temporarily joined to the coupling member 20. Then, a new ferrule 30 can be attached to the joint body 10 so that the pipe P can be connected again.

The bite-in type pipe connection structure of the above described configuration has the following advantages.

(1) Since the thin low-strength portion 34a is formed in the distal end portion 36, it is possible to allow the distal end portion 36 to be deformed to restrain the pipe P to be connected when the coupling member 20 is manually rotated to be fastened to the joint body 10. That is, at an initial stage of the pipe connecting process, it possible to deform the distal end portion 36 by manually rotating the coupling member 20, thereby restraining the pipe P.

(2) The front tapered surface 32a, which corresponds to the low-strength portion 34a, and the rear tapered surface 32c are coupled to each other by the level changing portion 32b. This allows the rearward portion 30A of the low-strength portion 34a to have a required thickness for airtightly retaining the pipe P to be connected. Therefore, by increasing the thickness of the rearward portion 30A of the low-strength portion 34a, a force required for deforming the rearward portion 30A to airtightly retain the pipe P (fastening torque) can be increased. Accordingly, the resistance of the bite-in type pipe connection structure against an unbalanced load is improved, and the airtightness is prevented from being reduced by an unbalanced load.

(3) The low-strength portion 34a has the notch 34, which is formed by cutting in the pipe insertion hole 31 radially toward the outside. This allows the low-strength portion 34a to be easily formed.

(4) The cross-sectional shape of the notch 34 in the axial direction is triangular, and the intersection 34b between the rear inner wall of the notch 34 and the inner wall of the pipe insertion hole 31 functions as an edge portion that airtightly retains the pipe P to be connected. This allows the intersection 34b to bite into the pipe P to be connected, and the pipe retaining force and the airtight retaining performance of the rearward portion 30A are improved.

(5) The triangular shape forming the notch 34 is substantially a right triangle such that the intersection 34b between the rear surface of the notch 34 and the inner circumferential surface of the pipe insertion hole 31 form a right angle. This configuration improves the biting-in function of the edge portion at the intersection 34b. As a result, the pipe retaining force and the airtight retaining performance of the rearward portion 30A are further improved.

(6) Since the surface of the level changing portion 32b is an inclined surface, and the level changing portion 32b and the rear tapered surface 32c are connected at the boundary at a large angle. The cam surface 19 is therefore unlikely to be damaged.

(7) The angle θ2 formed by the inclined surface of the level changing portion 32b and the ferrule center line is set greater than the angle θ1 formed by the front tapered surface 32a and the ferrule center line. This configuration allows the level changing portion 32b to be formed to have appropriate shape and size.

(8) The angle θ2 formed by the inclined surface of the level changing portion 32b and the ferrule center line is set greater than the angle θ1 formed by the front tapered surface 32a and the ferrule center line and than the angle θ3 formed by the rear tapered surface 32c and the ferrule center line. This configuration allows the level changing portion to be formed to have appropriate shape and size.

(9) The thickness t1 of the front end of the distal end portion 36 of the ferrule 30 and the outer diameter d of the pipe P to be connected have the relationship defined by the expression $0.005 \leq t1/d \leq 0.05$. This facilitates machining of the distal end portion 36, and the temporary pipe retaining process is not hindered. If t1/d is less than this range, machining of the distal end portion 36 is difficult. If t1/d is greater than this range, it is difficult to perform the temporary pipe retaining process for restraining the pipe by manually turning the pipe.

(10) The thickness t2 of a part of the ferrule 30 that corresponds to the intersection 34b (that is, the thickness of a part corresponding to the forward edge portion) and the outer diameter d of the pipe P to be connected are set to have the relationship expressed by the expression (2), or $0.01 \leq t2/d \leq 0.1$. Accordingly, the airtightness is prevented from being reduced by an unbalanced load, and the temporary pipe retaining process is not hindered. If t2/d is less than this range, the resistance against an unbalanced load is reduced, and the airtightness is likely to be reduced by an unbalanced load. If t2/d is greater than this range, it is difficult to perform the temporary pipe retaining process by manual turning.

(11) The distance s1 from the front end of the distal end portion 36 to the intersection 34b in the ferrule 30 (that is, the distance to from the front end to the forward edge portion) and the outer diameter d of the pipe P to be connected are set to have the relationship defined by the expression (3), or $0.02 \leq s1/d \leq 0.1$. Therefore, restraining of the pipe P and the temporary pipe retaining process are not hindered. If s1/d is less than this range, the pipe P to be connected cannot be restrained by deforming the distal end portion 36. If s1/d is greater than this range, it is difficult to perform the temporary pipe retaining process by manual turning.

Figure 6:
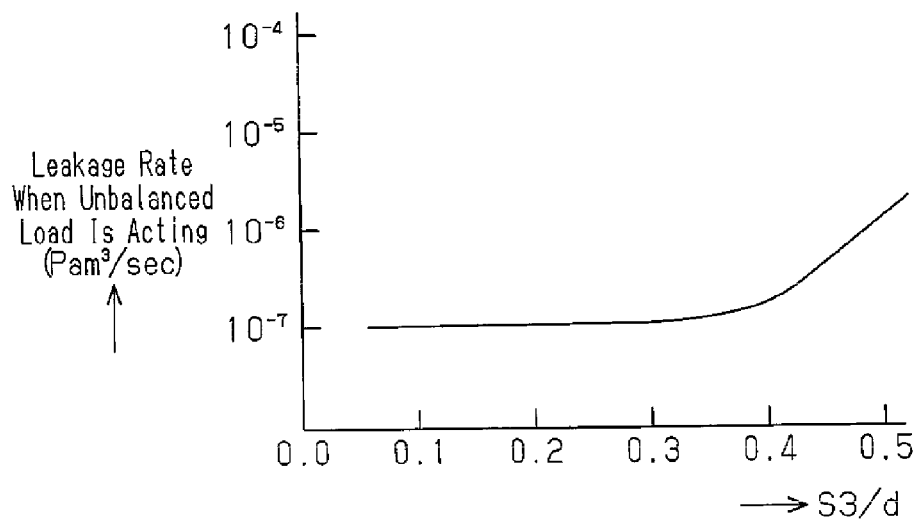
FIG. 6 is a graph representing the relationship between the airtightness and the ratio of the axial length of the level changing portion of the bite-in type pipe connection structure to the outer diameter of the pipe to be connected.
Figure 7:
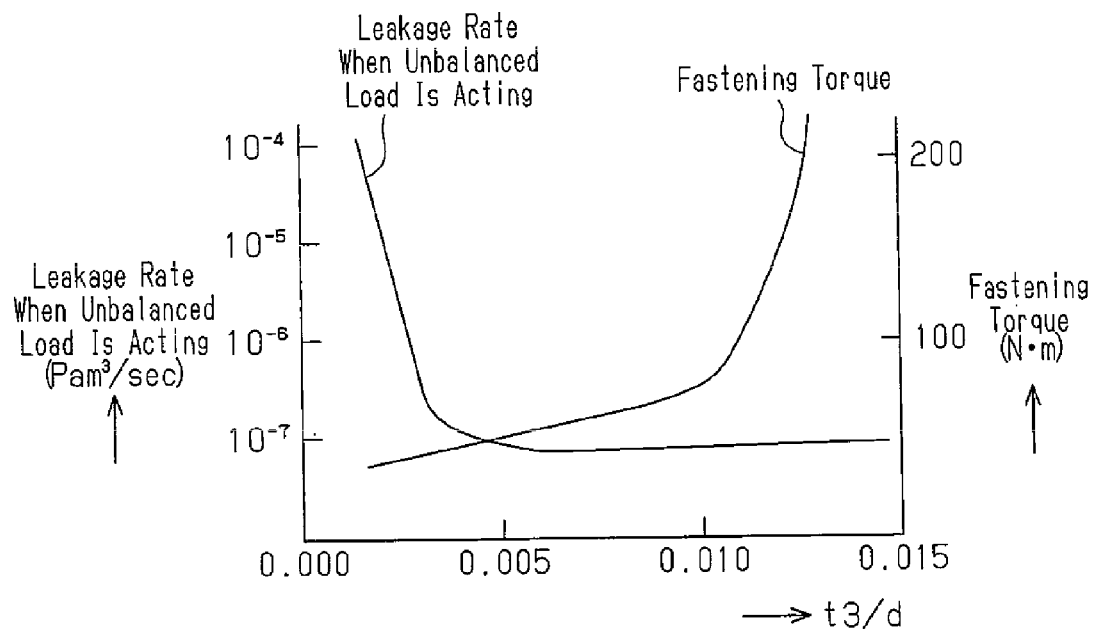
FIG. 7 is a graph representing the relationship among the tightening torque of the coupling member, the airtightness, and the ratio of the difference in thickness between the front and rear ends of the level changing portion of the bite-in type pipe connection structure to the outer diameter of the pipe to be connected.

(12) The length s3 of the level changing portion 32b along the axial direction of the ferrule 30 and the outer diameter d of the pipe P to be connected have the relationship defined by the expression (4), or $0 \leq s3/d \leq 0.4$. The airtightness is therefore prevented from being reduced. The thickness difference t3 between the front and rear ends of the level changing portion 32b and the outer diameter d of the pipe to be connected have the relationship defined by an expression (5), or $0.03 \leq t3/d \leq 0.1$. Accordingly, the airtightness is prevented from being reduced by an unbalanced load, and the fastening torque of the coupling member 20 can be maintained within the limit. When the s3/d is greater than the range, the resistance against an unbalanced load decreases, and the airtightness is significantly reduced. This is shown by the data of FIG. 6. When t3/d is less than the range, the resistance against an unbalanced load decreases, and the airtightness is significantly reduced. When t3/d is greater than the range, the tightening torque of the joint portion becomes excessively great and the workability is lowered, accordingly. This is shown by the data of FIG. 7.

(13) A valve and a bite-in type pipe joint 1 that use the bite-in type pipe connection structure according to the present embodiment can temporarily retain the pipe P in an initial stage of the pipe connection process. This facilitates the pipe connection process.

(14) A refrigeration device that uses the valve or the bite-in type pipe joint 1 according to the present embodiment can temporarily retain the pipe P in an initial stage of the pipe connection process. This facilitates the pipe connection process.

(Modifications)

Figure 8:
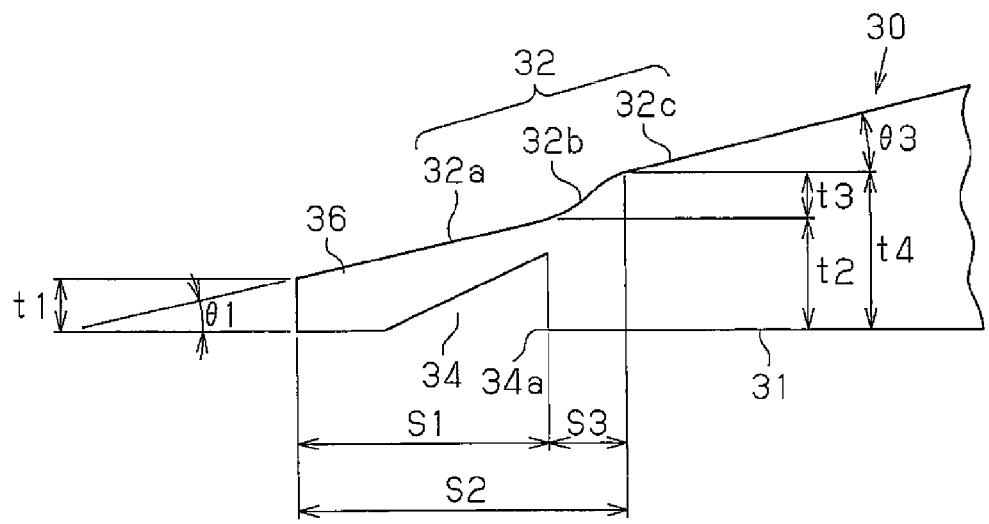
FIG. 8 is a partially enlarged view illustrating a ferrule according to a modification.

Instead of an inclined surface, the level changing portion 32b of the above described embodiment may be an overall smoothly curved surface as a whole as shown in FIG. 8. In this case, the cam surface 19 is unlikely to be damaged as in the above described embodiment, and the shape and size of the level changing portion 32b can be formed appropriately.

Figure 9:
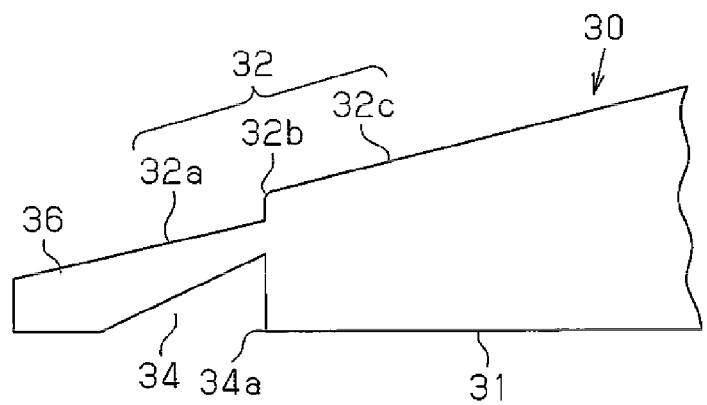
FIG. 9 is a partially enlarged view illustrating a ferrule according to another modification.
Figure 10A:
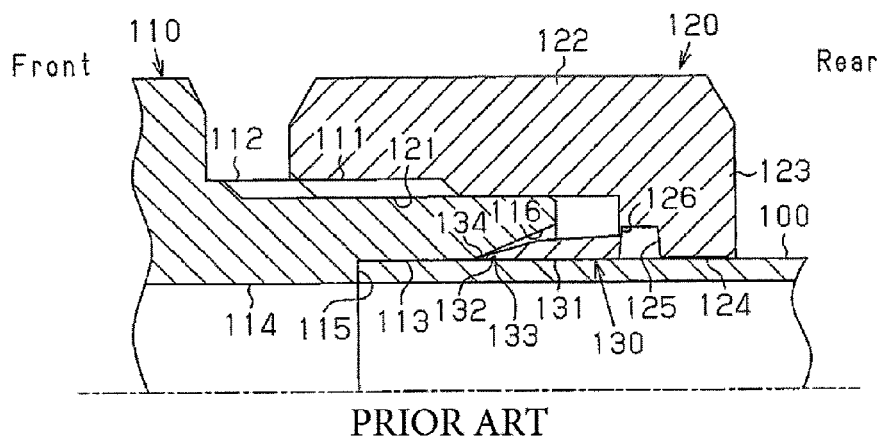
FIG. 10(a) shows the beginning of fastening of a typical coupling member.
Figure 10B:
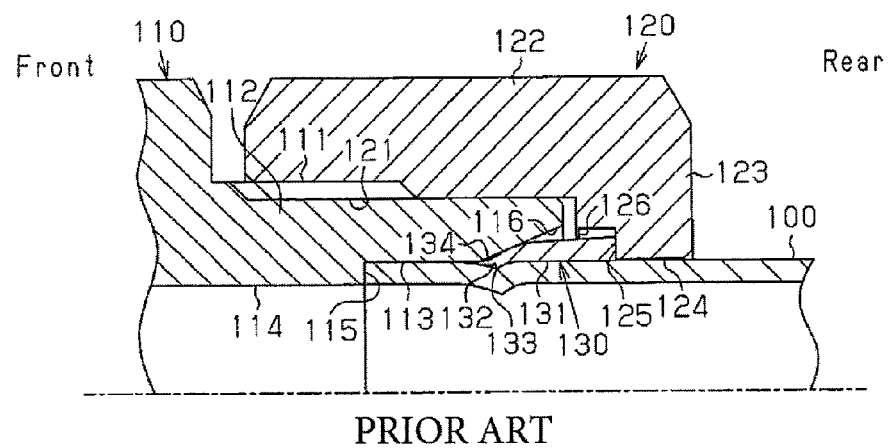
FIG. 10(b) shows the completion of fastening of the typical coupling member.
Figure 11:
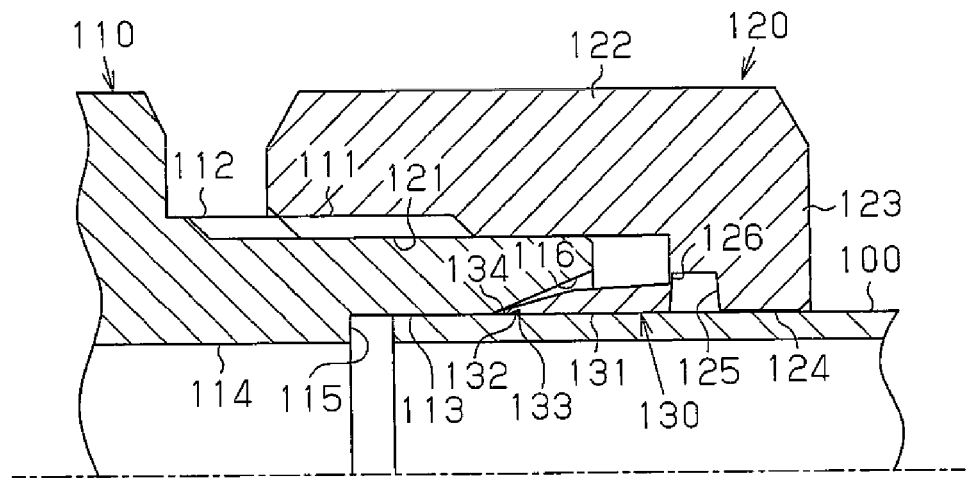
FIG. 11 presents partial cross-sectional views showing the conventional bite-in type pipe joint, where
Figure 11:
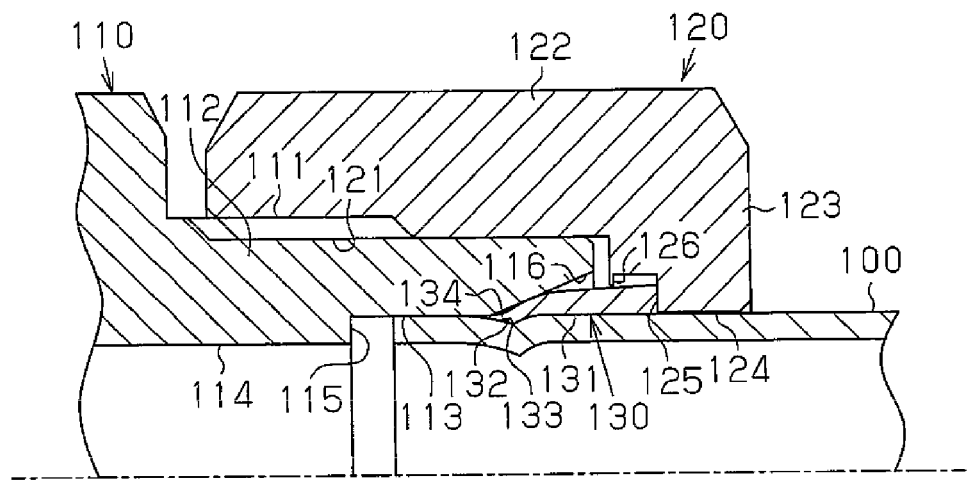

Instead of an inclined surface, the level changing portion 32b of the first embodiment may be replaced by the structure shown in FIG. 9. In this modification, the level changing portion 32b may be replaced by a curved surface that connects a surface that is perpendicular to the ferrule center line and extends radially outward to the rear tapered surface 32c. In this case, the cam surface 19 is unlikely to be damaged as in the above described embodiment, and the shape and size of the level changing portion 32b can be formed appropriately.

In the above described embodiment, the angle θ1 formed by the front tapered surface 32a and the ferrule center line and the angle θ3 formed by the rear tapered surface 32c and the ferrule center line are substantially equal to each other. However, these angles may be different from each other. For example, θ3 may be greater than θ1.

The ferrule 30 is formed independently from the joint body 10 and the coupling member 20, and temporarily joined to the coupling member 20 at the stage of components before assembly. However, the ferrule 30 may be of an independent type that is not temporarily joined. An independent type ferrule does not need to be a solid component, but may be formed of multiple components. The ferrule 30 may be integrated with the coupling member 20. In this case, the ferrule 30 is separated at the beginning of the pipe connecting process, and functions as an independent ferrule thereafter.

The mechanism for temporarily joining the ferrule 30 to the coupling member 20 may be changed as long as the mechanism allows the ferrule 30 to be temporarily joined to the coupling member 20, to be rotatable and movable in the axial direction in a predetermined range, to be transported when temporarily joined to and integrated with the coupling member 20, and to be installed in the joint body 10.

The joint body 10 is configured such that the pipe Pa of the connectable device is brazed to the socket portion 12. However, an external thread may be formed on the outer circumference of the socket portion 12, and the joint body 10 may be directly attached to a device such as a stop valve in the connectable device.

The coupling member 20 may have a structure in which the pipe connecting portion 23 and the grip portion 24 are not separated during the fastening procedure.

INDUSTRIAL APPLICABILITY

The bite-in type pipe connection structure of the present invention may be applied to a refrigerant circuit, water circuit, gas circuit in a refrigeration device, air conditioner, water heating device such as a water heater, water supply device, and a production facility. The bite-in type pipe connection structure of the present invention may be applied to connections between pipes, pipe joint portions in valves such as stop valves, and a pipe joint portion in various devices. The bite-in type pipe connection structure of the present invention may be applied to metal pipes such as copper pipes and stainless steel pipes, as well as to resin pipes.

DESCRIPTION OF THE REFERENCE NUMERALS

P . . . Pipe (to be connected), d . . . Outer diameter of pipe (to be connected), s1 . . . Distance, s3 . . . Length, t1 and t2 . . . Thickness, t3 . . . Thickness difference, θ1, θ2, and θ3 . . . Angles, 1 . . . Bite-in type pipe joint, 10 . . . Joint body, 19 . . . Cam surface, 20 . . . Coupling member, 30 . . . Ferrule, 30A . . . Rearward portion, 31 . . . Pipe insertion hole, 32 . . . Tapered surface, 32a . . . (Front) tapered surface, 32b . . . Level changing portion, 32c . . . (Rear) tapered surface, 34 . . . Notch, 34a . . . Low-strength portion, 34b . . . Intersection, and 36 . . . Distal end portion

The invention claimed is:

1. A bite-in type pipe connection structure comprising: a joint body having a cam surface; an annular ferrule formed to have a tapered surface with an outer circumferential surface that becomes wider in a direction opposite to the cam surface, the ferrule having at a center a pipe insertion hole through which a pipe to be connected is passed through; and a coupling member that is fastened to the joint body to press the ferrule against the cam surface of the joint body, the pipe connection structure being characterized in that:

the ferrule includes: a low-strength portion for deforming a distal end portion of the ferrule so that the distal end portion restrains a pipe to be connected when the coupling member is manually rotated to be fastened to the joint body; a level changing portion connecting a first tapered surface and a second tapered surface of the tapered surface to each other, the first tapered surface corresponding to the low-strength portion and the second tapered surface being farther from the cam surface than the first tapered surface is; and an adjacent portion that adjoins the low-strength portion from a side opposite to the cam surface, the adjacent portion airtightly retaining the pipe to be connected when the coupling member is fastened to the joint body, the outer diameter of the tapered surface at the boundary between the level changing portion and the second tapered surface is greater than the outer diameter of the tapered surface at the boundary between the level changing portion and the first tapered surface, and the level changing portion is formed such that the thickness of the adjacent portion has a value capable of airtightly retaining the pipe to be connected, the low-strength portion is a portion in which a notch is formed by cutting in the pipe insertion hole radially toward the outside, the outer circumferential surface of the level changing portion is formed as an inclined surface, and the angle defined by the inclined surface and the longitudinal axis of the ferrule is greater than the angle defined by the first tapered surface and the longitudinal axis of the ferrule.

2. The bite-in type pipe connection structure according to claim 1, characterized in that the cross-sectional shape of the notch along the axial direction of the ferrule is triangular and that an intersection between an inner wall of the notch that is on the side close to the adjacent portion and the inner wall of the pipe insertion hole functions as a portion for airtightly retaining the pipe to be connected.

3. The bite-in type pipe connection structure according to claim 2, characterized in that the cross-sectional shape of the notch along the axial direction of the ferrule is a right triangle and that the intersection of the notch is substantially a right angle.

4. The bite-in type pipe connection structure according to claim 1, characterized in that the angle defined by the inclined surface and the longitudinal axis of the ferrule is greater than the angle defined by the second tapered surface and the longitudinal axis of the ferrule.

5. The bite-in type pipe connection structure according to any one of claims 1 to 3, characterized in that the boundary between the outer circumferential surface of the level changing portion and the second tapered surface is shaped as a smoothly curved surface.

6. The bite-in type pipe connection structure according to any one of claims 1 to 3, characterized in that the outer circumferential surface of the level changing portion is an overall smoothly curved surface that extends from the first tapered surface to the second tapered surface.

7. The bite-in type pipe connection structure according to claim 1, characterized in that a thickness t1 of the front end of the distal end portion of the ferrule that is adjacent to the cam surface and an outer diameter d of the pipe to be connected have the relationship defined by an expression (1):

$$0.005 \leq t1/d \leq 0.05 \qquad \text{Expression (1)}.$$

8. The bite-in type pipe connection structure according to claim 7, characterized in that a thickness t2 of the ferrule at the intersection and the outer diameter d of the pipe to be connected have the relationship defined by an expression (2):

$$0.01 \leq t2/d \leq 0.1 \qquad \text{Expression (2)}.$$

9. The bite-in type pipe connection structure according to claim 8, characterized in that a distance s1 from the front end of the distal end portion to the intersection of the ferrule and the outer diameter d of the pipe to be connected have the relationship defined by an expression (3):

$$0.02 \leq s1/d \leq 0.1 \qquad \text{Expression (3)}.$$

10. The bite-in type pipe connection structure according to claim 9, characterized in that a length s3 of the level changing portion along the axial direction of the ferrule and the outer diameter d of the pipe to be connected have the relationship defined by an expression (4), and that a thickness difference t3 between ends of the level changing portion along the axial direction of the ferrule and the outer diameter d of the pipe to be connected have the relationship defined by expression (5):

$$0 \leq s3/d \leq 0.4 \qquad \text{Expression (4)};$$

$$0.03 t3/d \leq 0.1 \qquad \text{Expression (5)}.$$

11. A valve having a pipe joint portion, characterized in that the pipe joint portion includes the pipe connection structure according to claim 1.

12. A bite-in type pipe joint having a pipe joint portion, characterized in that the pipe joint portion includes the pipe connection structure according to claim 1.

13. A refrigeration device having a refrigerant circuit, characterized in that the refrigeration circuit includes the valve according to claim 11.

14. A refrigeration device having a refrigerant circuit, characterized in that the refrigeration circuit includes the bite-in type pipe joint according to claim 12.

* * * * *